INVENTOR.
JULIUS A. BARKER JR.
-AND- RICHARD PHELPS
BY
ATTORNEY.

Jan. 12, 1965 J. A. BARKER, JR., ETAL 3,165,332
AUXILIARY MOTOR VEHICLE LOAD CARRYING DEVICE
Filed Jan. 30, 1963 2 Sheets-Sheet 2
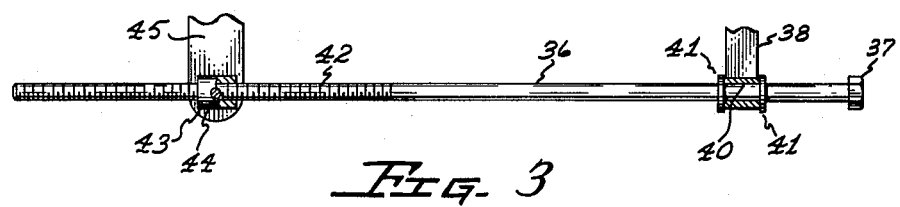
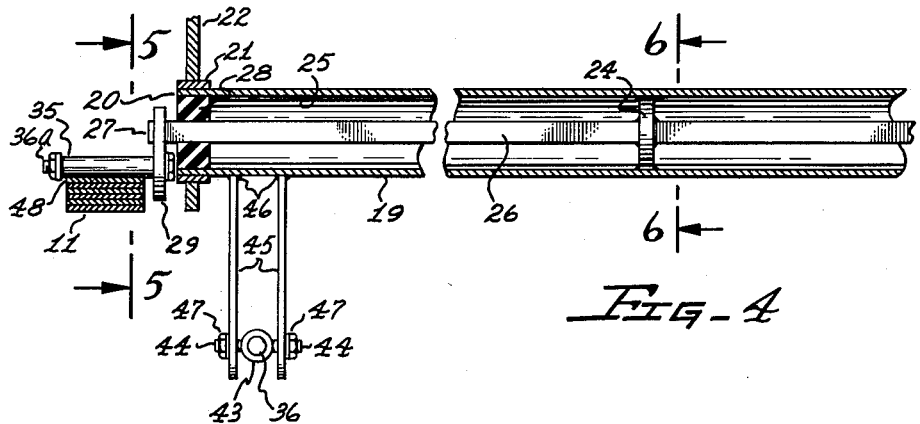
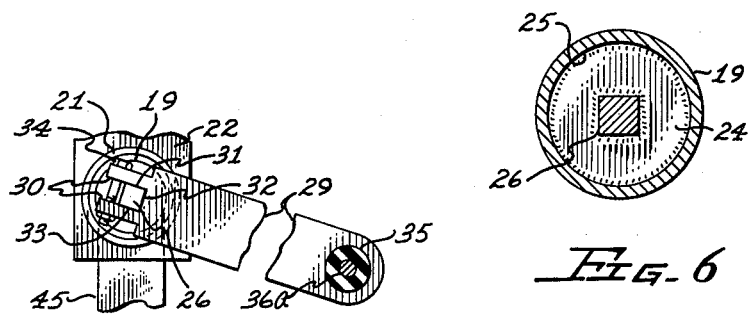
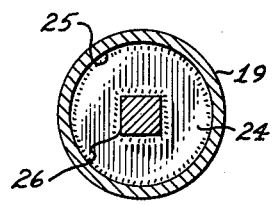
INVENTOR.
JULIUS A. BARKER JR.
-AND- RICHARD PHELPS
BY
ATTORNEY.

3,165,332
AUXILIARY MOTOR VEHICLE LOAD
CARRYING DEVICE
Julius A. Barker, Jr., 2501 N. 69th St., Scottsdale, Ariz.,
and Richard Phelps, 4434 E. Almeria, Phoenix, Ariz.
Filed Jan. 30, 1963, Ser. No. 254,862
2 Claims. (Cl. 280—124)

This invention pertains to an auxiliary load carrying device for motor vehicles.

One of the objects is to provide an auxiliary load carrying device adapted to be installed on a motor vehicle to supplement the load carrying capacity on the regular spring suspension of the vehicle.

Another object is to provide an auxiliary load carrying device which is universally adapted to installation on a motor vehicle.

A further object is to provide an auxiliary load carrying device which is quick and easy to install on a motor vehicle to increase the load carrying capacity of the regular spring suspension of the vehicle.

And a further object is to provide an auxiliary load carrying device which may be readily and conveniently adjusted to required variations in loading of the vehicle for proper operating conditions of the vehicle.

Further features and advantages of this invention will appear from a detailed description of the drawings in which:

FIG. 3 is an enlarged fragmentary sectional view on the line 3—3 of FIG. 1.

FIG. 4 is an enlarged fragmentary sectional view on the line 4—4 of FIG. 1.

FIG. 5 is an enlarged fragmentary sectional view on the line 5—5 of FIG. 4.

FIG. 6 is an enlarged sectional view on the line 6—6 of FIG. 4.

Figure 1:
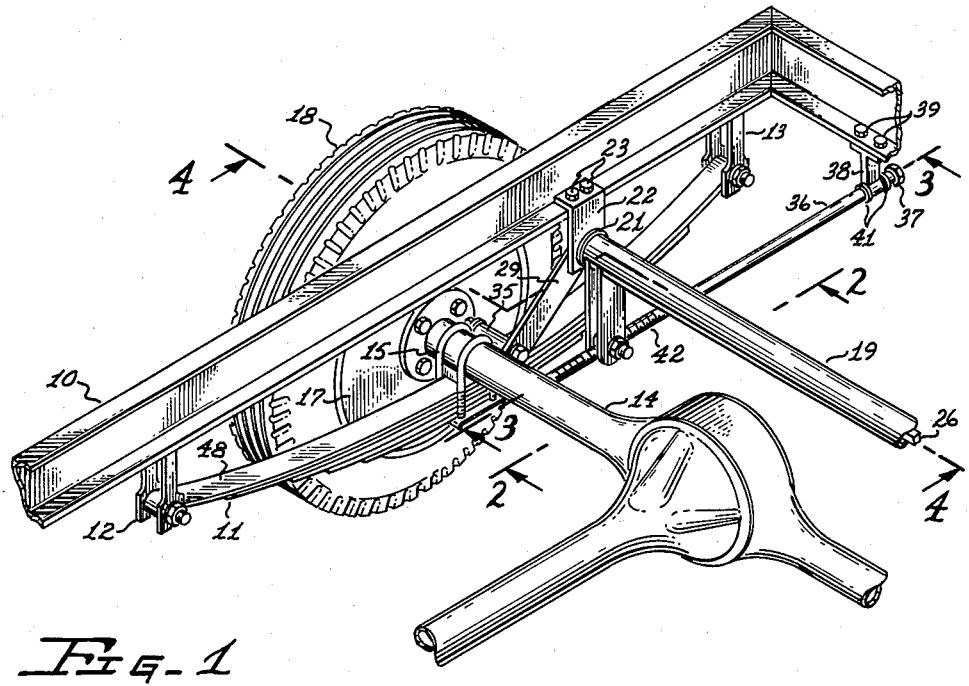
FIG. 1 is a fragmentary perspective view showing the device incorporating the features of this invention adapted to the conventional rear end spring suspension of a motor vehicle.
Figure 2:
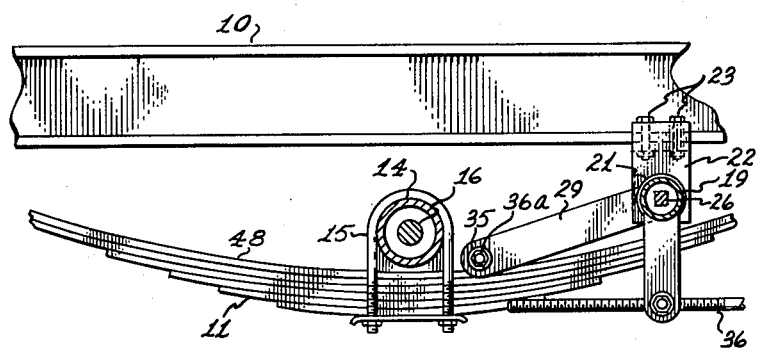
FIG. 2 is an enlarged fragmentary sectional view on the line 2—2 of FIG. 1.

As an example of one embodiment of this invention, there is shown a motor vehicle having a frame 10 which is supported on the usual semi-elliptical leaf spring 11 connected by the usual spring shackles 12 and 13. Since the application of the device is the same for both sides of the vehicle only the right rear portion is illustrated. The rear axle housing 14 is rigidly clamped intermediate the end of the spring 11 by suitable U-bolts 15 and contains the usual drive shaft 16 connected to drive the road wheel 17 carrying the tire 18.

The particular apparatus of the instant invention comprises a main housing 19 which may take the form of a tubular housing having its outer ends 20 journaled in suitable bearing bushings 21 fixed in the support brackets 22 suitably fixed at each side of the vehicle frame 10 by appropriate bolts 23. A torque disc 24 is fixed intermediate the bore 25 of the housing 19 to which is fixed the intermediate portion of a torque bar 26 which may be preferably of square cross section. The outer portions adjacent the ends 27 of the torque bar 26 are supported in rubber bushings 28 which in turn are journaled in the bore 25 adjacent the outer ends 20 of the housing 19.

Fixed to the outer ends 27 of the torque bar 26 are the torque arms 29 having a slotted inner end 30 which snugly fits the squared sides 31, 32 and 33 of the torque bar 26 while a clamp bolt 34 securely locks the arms to the outer ends 27 of the torque bar 26. On the outer end of the arms 29 are fixed spring engaging sleeves 35 through which pass the bolts 36a which secure the sleeves 35 in operative position on the arms 29.

The rotary position of the housing 19 in the bushing 21 is controlled by means of an adjusting screw 36 having a wrench receiving head 37 formed on its outer end. A bracket 38 is fixed to the frame 10 by suitable bolts 39 and has a bore 40 to rotatively receive the adjusting screw 36 while collars 41 fixed to the adjusting screw 36 each side of the bracket 38 confine the screw against axial movement as it is rotated. The inner end of the screw 36 is formed with a threaded portion 42 which operatively engages in a nut 43 having trunions 44 pivotally supported in the outer ends of the pair of positioning arms 45 rigidly fixed at their inner ends 46 to the periphery of the housing 19. Suitable nuts 47 secure the trunnions 44 in proper operative position on the arms 45. When the head 37 of the adjusting screw 36 is turned the nut 43 longitudinally traverses the screw threads 42 to swing the arms 45 to thereby rock the housing 19 to desired position.

In operation: The adjusting screw 36 is rotated to apply the spring engaging sleeve 35 into contact with the top leaf 48 with the required pressure for the additional load placed in the vehicle. As the screw 36 is rotated further a torque wrap-up in the torque bar is set up, the reaction from which tends to provide an additional yielding load supporting force between the frame and the wheels and tires 18 so as to properly support additional loads with proper riding qualities. The sleeve 35 engages the top of the spring 11 closely adjacent the axle housing 14 so that the torque bar, for all practical purposes, applies its forces to the axle housing 14. The installation is simple and easy to make on the vehicle since only two brackets 22 and one bracket 38 are all that are required to attach the device to the vehicle frame 10.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. An auxiliary load carrying device for an existing vehicle having a frame, an axle, and load carrying springs supporting the frame on the axle comprising in combination:
   (a) a main tubular housing,
   (b) means for rotatably mounting the said main housing on the frame of a vehicle,
   (c) a torque bar having one end fixed to said main housing,
   (d) a torque arm fixed to the other end of said torque bar,
   (e) a spring contacting element adapted to engage said vehicle spring connected to move up and down in response to the up and down rear axle housing and spring movement of the motor vehicle,
   (f) and means interconnected between said frame and said main housing operable to adjust the relative rotary position of said main housing on said frame to increase or decrease the torque in said torque bar against said spring to accommodate variations in load carried by said vehicle.

2. An auxiliary load carrying device for an existing vehicle having a frame, an axle, and load carrying springs supporting the frame on the axle comprising in combination:
   (a) a main tubular housing,
   (b) a pair of laterally spaced support brackets fixed on the vehicle frame adapted to rotatively support the outer ends of said tubular housing on the vehicle frame,
(c) a torque disc fixed within and intermediate the ends of said tubular housing,
(d) a torque bar fixed intermediate its ends to said torque disc,
(e) resilient bushings journaled in the bore adjacent the outer ends of said tubular housing adapted to rotatively support the outer ends of said torque bars,
(f) torque arms fixed to the ends of said torque bars,
(g) means fixed on the outer ends of said torque arms adapted to engage the top of the springs of the vehicle so as to move up and down in response to the up and down movement of the vehicle axle relative to the vehicle frame,
(h) and adjustable means interconnected between the vehicle frame and said tubular housing for selectively rotatively positioning said tubular housing in said brackets for varying the pressure from said torque bar applied to the vehicle springs to accommodate variation of load in the vehicle.

References Cited by the Examiner
UNITED STATES PATENTS

| 2,059,908 | 11/36 | Rabe | 280—124 X |
| 2,227,762 | 1/41 | Ronning | 267—58 |

FOREIGN PATENTS 1,012,533  7/57  Germany.

A. HARRY LEVY, *Primary Examiner.*
LEO FRIAGLIA, *Examiner.*